(12) United States Patent
Chattell

(10) Patent No.: US 11,843,416 B2
(45) Date of Patent: Dec. 12, 2023

(54) HYBRID OPTICAL FIBER METALLIC ACCESS NETWORK

(71) Applicant: British Telecommunications Public Limited Company, London (GB)

(72) Inventor: Andrew Chattell, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/733,676

(22) PCT Filed: Mar. 25, 2019

(86) PCT No.: PCT/EP2019/057419
§ 371 (c)(1),
(2) Date: Sep. 28, 2020

(87) PCT Pub. No.: WO2019/185537
PCT Pub. Date: Oct. 3, 2019

(65) Prior Publication Data
US 2021/0091853 A1   Mar. 25, 2021

(30) Foreign Application Priority Data

Mar. 28, 2018 (EP) .................................... 18164817

(51) Int. Cl.
*H04B 10/25* (2013.01)
*H04L 12/28* (2006.01)
(Continued)

(52) U.S. Cl.
CPC ............. *H04B 10/25* (2013.01); *H04B 10/27* (2013.01); *H04L 12/2858* (2013.01); *H04L 2012/6478* (2013.01)

(58) Field of Classification Search
CPC .......... H04B 10/25751; H04B 10/2575; H04B 10/25753
See application file for complete search history.

(56) References Cited

U.S. PATENT DOCUMENTS 5,550,836 A   8/1996   Albrecht et al.
5,576,874 A   11/1996   Czerwiec et al.
(Continued)

FOREIGN PATENT DOCUMENTS

EP   2209325 A1   7/2010
EP   3285421 A1   2/2018
(Continued)

OTHER PUBLICATIONS

Advanced Media Technologies, FST1203: G.Fast Modem, 106MHz Gfast for Coax or Phoneline, 2017 (Year: 2017).*
(Continued)

*Primary Examiner* — Jai M Lee
(74) *Attorney, Agent, or Firm* — Patterson Thuente IP

(57) ABSTRACT

The present disclosure provides a network architecture in which the modem in a hybrid metallic-optical fiber access network is moved from the customer premises to the distribution point. Multiple copper pairs can be used to transmit phantom modes over the copper pairs to the distribution point. Alternatively, or in addition, multiple data signals can be transmitted to a single customer premises with the modem collating the multiple data signals at the distribution point.

13 Claims, 7 Drawing Sheets

(51) Int. Cl.
*H04B 10/27* (2013.01)
*H04L 12/64* (2006.01)

(56) References Cited

U.S. PATENT DOCUMENTS

| | | | | |
|---|---|---|---|---|
| 5,917,624 | A * | 6/1999 | Wagner | H04Q 11/0478 398/71 |
| 6,160,990 | A | 12/2000 | Kobayashi et al. | |
| 6,445,712 | B1 | 9/2002 | Cooperman et al. | |
| 6,650,697 | B1 | 11/2003 | Tate et al. | |
| 6,895,081 | B1 | 5/2005 | Schmidt et al. | |
| 8,396,369 | B1 * | 3/2013 | Farmer | H04B 10/25754 398/115 |
| 8,411,696 | B1 | 4/2013 | Ko et al. | |
| 8,588,285 | B2 | 11/2013 | Humphrey et al. | |
| 8,601,289 | B1 | 12/2013 | Smith et al. | |
| 8,854,948 | B2 * | 10/2014 | Pereira | H04N 21/6405 370/216 |
| 9,113,237 | B2 * | 8/2015 | Boyd | H04Q 11/0067 |
| 9,191,685 | B2 * | 11/2015 | Bowler | H04N 21/238 |
| 9,319,537 | B2 * | 4/2016 | Peker | H04L 12/2885 |
| 9,363,016 | B2 * | 6/2016 | Chen | H04B 10/27 |
| 10,069,617 | B2 | 9/2018 | Al Rawi et al. | |
| 10,097,236 | B2 | 10/2018 | Al Rawi et al. | |
| 10,237,398 | B2 * | 3/2019 | Kim | H04L 12/2869 |
| 10,305,716 | B2 | 5/2019 | Humphrey et al. | |
| 10,574,356 | B2 * | 2/2020 | Chapman | H04B 10/25751 |
| 10,721,539 | B1 * | 7/2020 | Pillai | H04B 10/0795 |
| 10,834,486 | B2 * | 11/2020 | Cooper | H04L 41/0853 |
| 10,841,126 | B2 | 11/2020 | Linney | |
| 10,911,602 | B2 * | 2/2021 | Horsley | H04L 5/14 |
| 11,277,208 | B2 * | 3/2022 | Torres | H04Q 1/028 |
| 2003/0046706 | A1 * | 3/2003 | Rakib | H04N 7/106 725/111 |
| 2003/0108191 | A1 | 6/2003 | Kerpez | |
| 2003/0149971 | A1 * | 8/2003 | Basil | H04N 21/6583 725/16 |
| 2004/0071216 | A1 | 4/2004 | Richardson et al. | |
| 2006/0268966 | A1 * | 11/2006 | Cioffi | H04L 5/20 375/222 |
| 2007/0019956 | A1 * | 1/2007 | Sorin | H04J 14/0282 398/71 |
| 2007/0121793 | A1 | 5/2007 | Wang et al. | |
| 2007/0259680 | A1 | 11/2007 | Stolle et al. | |
| 2008/0069017 | A1 | 3/2008 | Clausen et al. | |
| 2008/0117863 | A1 | 5/2008 | Cotton et al. | |
| 2008/0166125 | A1 * | 7/2008 | Laamanen | H04M 11/062 398/71 |
| 2008/0170605 | A1 * | 7/2008 | Uhlemann | H04M 11/062 375/216 |
| 2008/0170609 | A1 | 7/2008 | Heidari et al. | |
| 2008/0310842 | A1 * | 12/2008 | Skrobko | H04Q 11/0067 398/72 |
| 2008/0317161 | A1 | 12/2008 | Pascal | |
| 2009/0010251 | A1 | 1/2009 | Bullman et al. | |
| 2009/0060530 | A1 * | 3/2009 | Biegert | H04Q 11/0067 398/214 |
| 2009/0205007 | A1 * | 8/2009 | Woodward | H04J 14/0246 725/129 |
| 2010/0313225 | A1 * | 12/2010 | Cholas | H04N 21/4402 725/62 |
| 2011/0170424 | A1 | 7/2011 | Safavi | |
| 2011/0280249 | A1 * | 11/2011 | Shrum, Jr. | H04L 12/2801 370/401 |
| 2012/0250744 | A1 | 10/2012 | Humphrey et al. | |
| 2013/0083725 | A1 | 4/2013 | Mallya et al. | |
| 2013/0142515 | A1 * | 6/2013 | Chen | H04Q 11/0067 398/67 |
| 2013/0294597 | A1 * | 11/2013 | Shi | H04M 11/062 379/406.01 |
| 2013/0322504 | A1 * | 12/2013 | Asati | H04L 41/12 375/224 |
| 2014/0119732 | A1 * | 5/2014 | Stoneback | H04J 3/0661 398/66 |
| 2014/0233951 | A1 * | 8/2014 | Cook | H04N 21/235 398/67 |
| 2014/0307749 | A1 * | 10/2014 | Liang | H04L 12/2898 370/509 |
| 2015/0026750 | A1 | 1/2015 | Wachob et al. | |
| 2015/0103981 | A1 * | 4/2015 | Berg | H04M 3/306 379/1.04 |
| 2015/0117851 | A1 | 4/2015 | Wellbrock et al. | |
| 2015/0281434 | A1 | 10/2015 | Levonas et al. | |
| 2016/0013864 | A1 | 1/2016 | Rafel Porti et al. | |
| 2016/0080241 | A1 | 3/2016 | Rocha De Maria et al. | |
| 2016/0294441 | A1 * | 10/2016 | Fazlollahi | H04L 5/0023 |
| 2017/0054515 | A1 * | 2/2017 | Soto | H04B 10/25 |
| 2017/0155424 | A1 * | 6/2017 | Feyh | H04L 25/0276 |
| 2017/0244446 | A1 | 8/2017 | Al Rawi et al. | |
| 2017/0366227 | A1 * | 12/2017 | Yang | H04B 3/487 |
| 2018/0034618 | A1 * | 2/2018 | Al Rawi | H04B 3/50 |
| 2019/0082244 | A1 | 3/2019 | Al Rawi | |
| 2019/0089408 | A1 * | 3/2019 | Humphrey | H04M 11/062 |
| 2020/0351117 | A1 * | 11/2020 | Barnett, Jr. | H04L 12/2869 |

FOREIGN PATENT DOCUMENTS

| | | |
|---|---|---|
| GB | 2571074 A | 8/2019 |
| WO | WO-0105156 A1 | 1/2001 |
| WO | WO-03021803 A1 | 3/2003 |
| WO | WO-2008045359 A2 | 4/2008 |

OTHER PUBLICATIONS

Examination Report under section 18(3) for Great Britain Application No. 1802257.4, dated Apr. 17, 2020, 5 pages.

Examination Report under section 18(3) for Great Britain Application No. 1805148.2, dated Jul. 23, 2020, 5 pages.

Examination Report under section 18(3) for Great Britain Application No. 1805148.2, dated Mar. 26, 2021, 3 pages.

Extended European Search Report for Application No. 18156369.3, dated Aug. 1, 2018, 10 pages.

Extended European Search Report for Application No. 18164817.1, dated Aug. 21, 2018, 7 pages.

GB Combined Search and Examination Report for GB Application No. 1802257.4, dated Aug. 9, 2018, 5 pages.

International Search Report for Application No. PCT/EP2019/057419, dated May 20, 2019, 4 pages.

Notification of Transmittal of the International Preliminary Report on Patentability for Application No. Application No. PCT/EP2019/057419, dated Jul. 6, 2020, 8 pages.

Quayle A., et al., "Broadband Access Development," Proceedings of the SPIE, The International Society for Optical Engineering, Issue 2917, Nov. 4, 1996, pp. 151-157.

Search Report under Section 17 for GB Application No. 1805148.2, dated Sep. 17, 2018, 5 pages.

Williamson R., et al., "Assessment of the Theoretical Limits of Copper in the Last Mile," Sagentia, Jul. 16, 2020, Retrieved from https://www.ofcom.org.uk/_data/assets/pdf_file/0024/27564/asses.pdf by the EPO on Jul. 18, 2018, 41 pages.

Written Opinion of International Preliminary Examining Authority for Application No. PCT/EP2019/057419, dated Jan. 16, 2020, 7 pages.

Written Opinion of International Searching Authority for International Application No. PCT/EP2019/057419, dated May 9, 2019, 6 pages.

Cioffi J.M., et al., "CuPON: the Copper alternative to PON 100 Gb/s DSL networks [Accepted from Open Call]" IEEE Communications Magazine, IEEE Servicecenter, vol. 45. No. 6, Jun. 2007, pp. 132-139.

Combined Search and Examination Report under Section 17 and 18(3) for GB Application No. 1605260.7, dated Sep. 29, 2016, 5 pages.

Examination Report for GB Application No. GB1605480.1, dated Sep. 30, 2016, 6 pages.

International Preliminary Report on Patentability for Application No. PCT/EP2017/057451, dated Oct. 2, 2018, 6 pages.

(56) References Cited

OTHER PUBLICATIONS

International Preliminary Report on Patentability for Application No. PCT/EP2017/057603, dated Oct. 11, 2018, 8 pages.
International Search Report and Written Opinion for Application No. PCT/EP2017/057451, dated May 30, 2017, 9 pages.
International Search Report and Written Opinion for Application No. PCT/EP2017/057603, dated Jun. 20, 2017, 10 pages.
International Telecommunication Union ITU-T G.993.2, "Series G:Transmission Systems and Media, Digital Systems and Networks Digital sections and digital line systems—Access Networks," Very high speed digital subscriber line transceivers 2 (VDSL2), section 7.2.1.3.2 "Power back-off PSD mask," Dec. 2011, 376 pages.
Law D., et al., "Evolution of Ethernet Standards in the IEEE 802.3 Working Group," IEEE Communications Magazine, IEEE Service Center, vol. 51, No. 8, Aug. 2013, pp. 88-96.
Moraes R.B., et al., "DMT MIMO IC Rate Maximization in DSL with Combined Signal and Spectrum Coordination" IEEE Transactions on Signal Processing, IEEE Service center, vol. 61, No. 7, Apr. 2013, pp. 1756-1769.
Moraes R.B., et al., "The Rate Maximization Problem in DSL with MixedSpectrum and Signal Coordination", 19th European Signal ProcessingConference (EUSIPCO 2011), Barcelona, spain, Aug. 29-Sep. 2, 2011, pp. 1583-1587.
Examination Report under section 18(3) for Great Britain Application No. 1805148.2, dated Nov. 5, 2021, 4 pages.

* cited by examiner

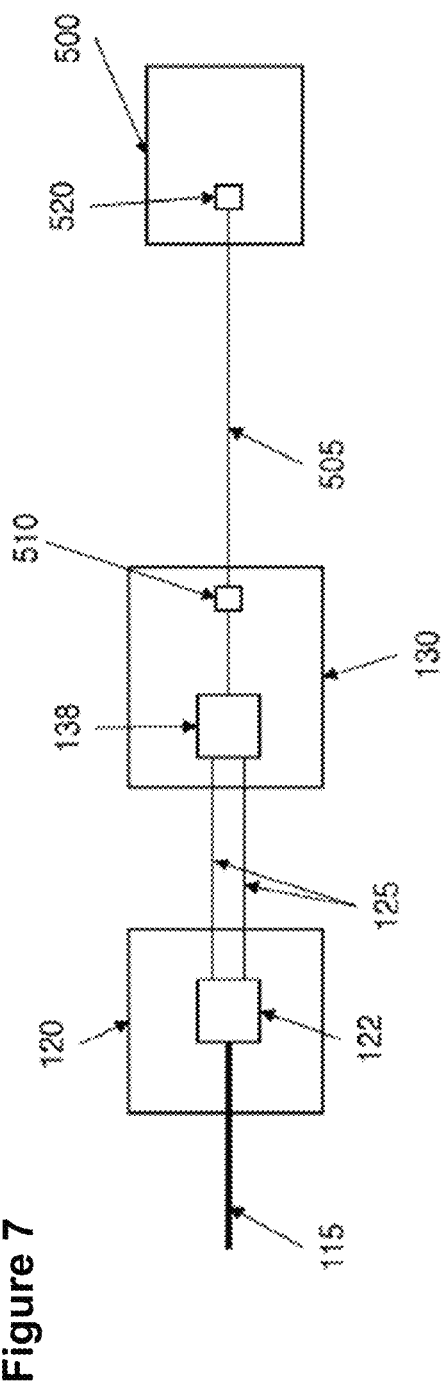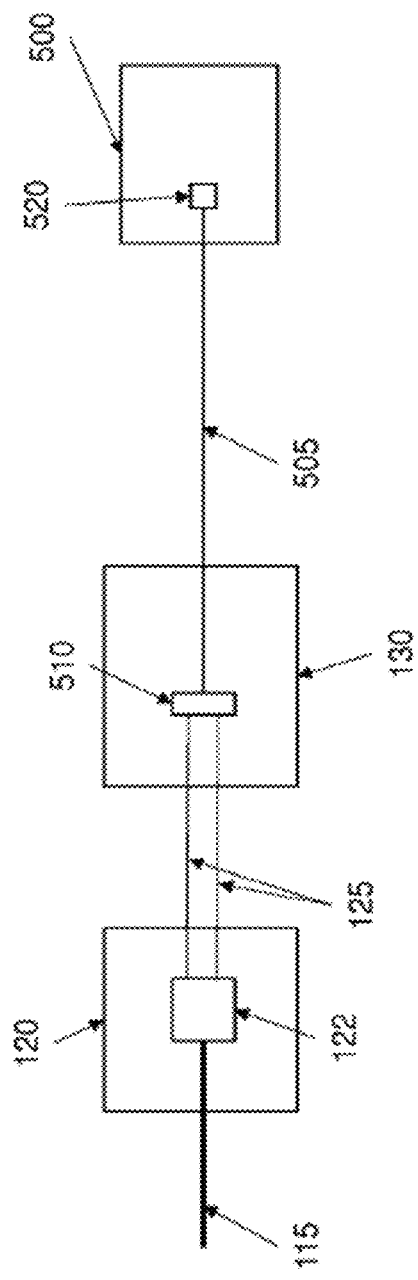

HYBRID OPTICAL FIBER METALLIC ACCESS NETWORK

PRIORITY CLAIM

The present application is a National Phase entry of PCT Application No. PCT/EP2019/057419, filed Mar. 25, 2019, which claims priority from EP Patent Application No. 18164817.1, filed Mar. 28, 2018, each of which is hereby fully incorporated herein by reference.

FIELD

The present disclosure relates to communications networks, particularly to hybrid fiber-copper access networks.

BACKGROUND

Since the advent of the World Wide Web, there has been a need to provide internet access to customers at ever increasing data rates. Asymmetric Digital Subscriber Line (ADSL) technology over existing copper wires can provide data rates of up to 24 Mbit/s, but many customers will experience significantly lower data rates due to the length of the network connection. One solution is to install Fiber to the Premises (FTTP) networks, such as PONs (Passive Optical Networks), but this approach requires very significant investment.

Another approach is to install limited amounts of optical fiber and to utilize it in conjunction with the legacy copper cabling. FIG. 1 shows a schematic depiction of a hybrid fiber-copper access network 100 in which a telephone exchange 110 is connected to a plurality of customer premises 500 (the customer premises may be domestic, commercial or industrial premises). One network architecture is Fiber to the Cabinet (FTTC [or FTTCab]), in which the telephone exchange 100 is connected to cabinets 120 by optical fiber cable 115. VDSL (Very-high-bit-rate Digital Subscriber Line) data signals can be transmitted over the fiber cable to equipment in the cabinet which converts the optical signal to an electrical signal which can then be transmitted over a copper cable 125 to the customer premises 500. The customer premises are connected to the cabinet via a distribution point 130, which is typically located near to the customer premises, for example at a telephone pole. The distribution point is connected to the customer premises 500 using a dropwire 135, either via a telephone pole or via an underground connection, for example within a duct.

The VDSL2 technology commonly used with FTTC networks is typically able to deliver data rates of up to 80 Mbit/s downstream and up to 20 Mbit/s upstream (or even higher) although the data rate is dependent on the length of the copper cables between the customer premises and the cabinet and commercial choices made by the network operator. The use of G.fast transmission technology, which is an advanced DSL transmission format, with such networks should provide downstream data rates of 300 Mbit/s-1 Gbit/s, depending on the length of the copper cable connecting the cabinet to the customer premises.

FIG. 2 shows a schematic depiction of a single line from the hybrid fiber-copper access network 100 described above with reference to FIG. 1 in which a cabinet 120 is connected to the exchange (not shown) via optical fiber cable 115. The cabinet 120 houses a multiplexer 122 (commonly referred to as a digital subscriber line add/drop multiplexer [DSLAM]) which receives optical data signals from the optical fiber cable. The multiplexer converts these optical data signals into an electrical format, for example G.fast, which are then transmitted over a copper cable 125 to the customer premises 500. The copper cable is routed physically from the location of the cabinet to a distribution point 130, which is commonly located at, or near to the top of a telephone pole 132. The distribution point will be connected to the customer premises via a dropwire 135 and the network will terminate within the customer premises. The copper cable 125 and the dropwire 135 are connected together so that there is a continuous electrical path from the multiplexer to the customer premises.

A modem, for example a G.fast modem, can be connected to the end of the dropwire in the customer premises such that data can be communicated between the multiplexer and the modem. The modem will be connected to further customer premises apparatus 520 such that devices in the customer premises can connect to the hybrid fiber-copper access network. The customer premises apparatus 520 may comprise, for example, a router and/or a wireless access point such that other devices may connect via a Wi-Fi or wired Ethernet connection.

SUMMARY

According to a first aspect of the disclosure, there is provided a hybrid optical fiber-metallic access network comprising: a multiplexer which is connected to an optical fiber cable and a first end of a metallic cable, the multiplexer being located at a first network location; and a modem which is connected to the second end of the metallic cable, the modem being located at a second network location, the second location being located away from the customer premises; and connected to an apparatus in the customer premises by a further cable, wherein, in use, the multiplexer is configured to transmit data using a plurality of data channels processed according to a first protocol; and the modem is configured to receive the plurality of data channels processed according to the first protocol and to transmit the data over the further cable to the customer premises apparatus using a second protocol.

In a first alternative the multiplexer is configured to transmit a plurality of data signals and one or more phantom modes using a plurality of copper pairs comprised within the metallic cable. Furthermore, the modem may be configured to receive a data signal and a phantom mode from the plurality of copper pairs comprised within the metallic cable.

In a second alternative the multiplexer is configured to transmit two or more data signals to a customer premises apparatus, each of the data signals being transmitted using a respective one of the plurality of copper pairs comprised within the metallic cable.

The present disclosure is enabled by the movement of the modem from the customer premises to the distribution point and the use of an ethernet connection to connect the modem to the customer premises apparatus. By having multiple copper pairs connecting the DSLAM to co-located modems then it is possible to inject phantom modes onto the copper pairs, increasing the data transmission capacity available between the cabinet and the distribution point. In the alternative, spare copper pairs and DSLAM output ports can be used to transmit two (or more) data signals to a customer premises apparatus, with the modem combining the two (or more) data signals such that they are transmitted over the further cable to the customer premises apparatus.

BRIEF DESCRIPTION OF THE FIGURES

In order that the present disclosure may be better understood, embodiments thereof will now be described, by way of example only, with reference to the accompanying drawings in which:

FIGS. 7a and 7b show a schematic depiction of a hybrid fiber-copper access network according to a further embodiment of the present disclosure.

DETAILED DESCRIPTION OF EMBODIMENTS

Figure 1:
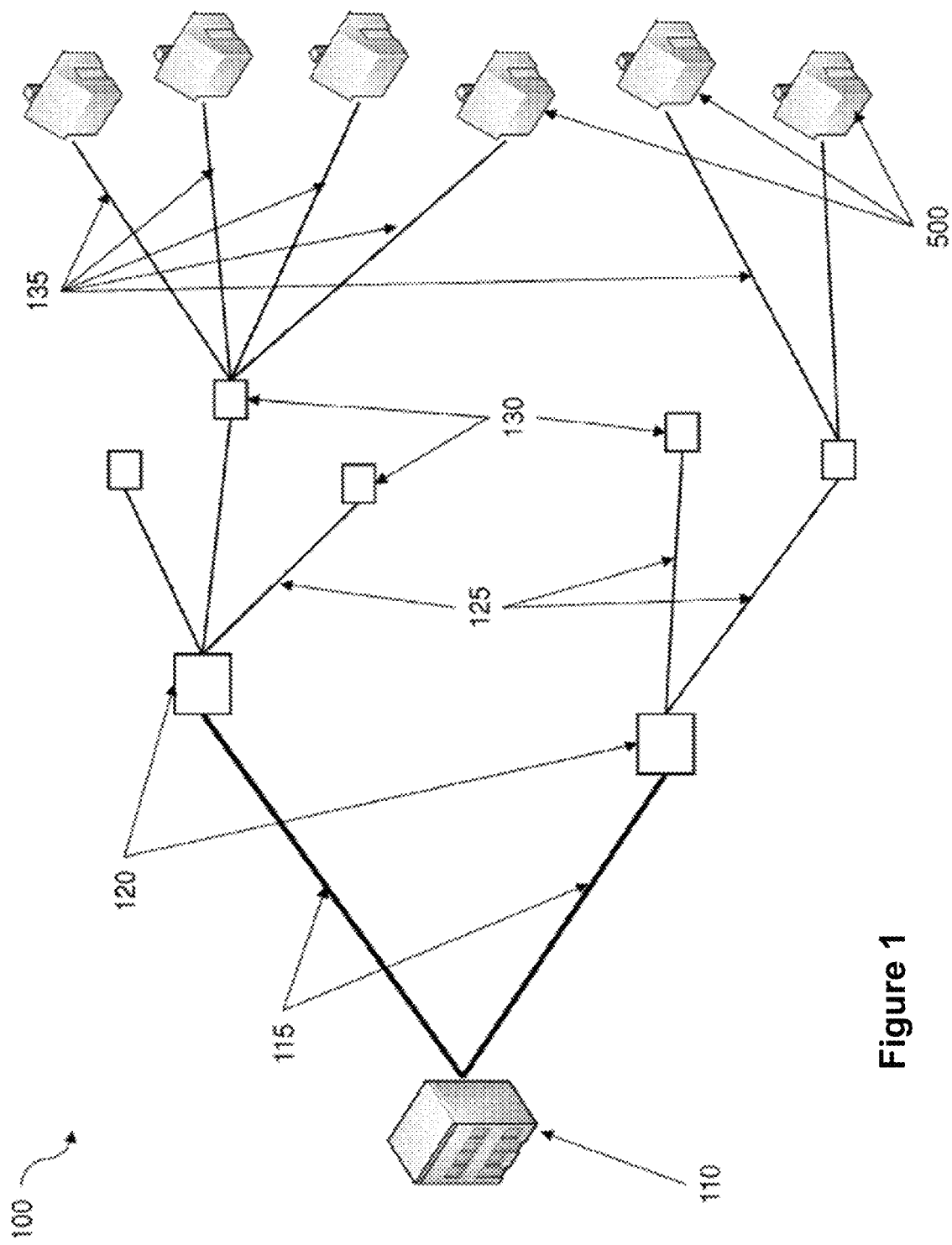
FIG. 1 shows a schematic depiction of a hybrid fiber-copper access network.
Figure 2:
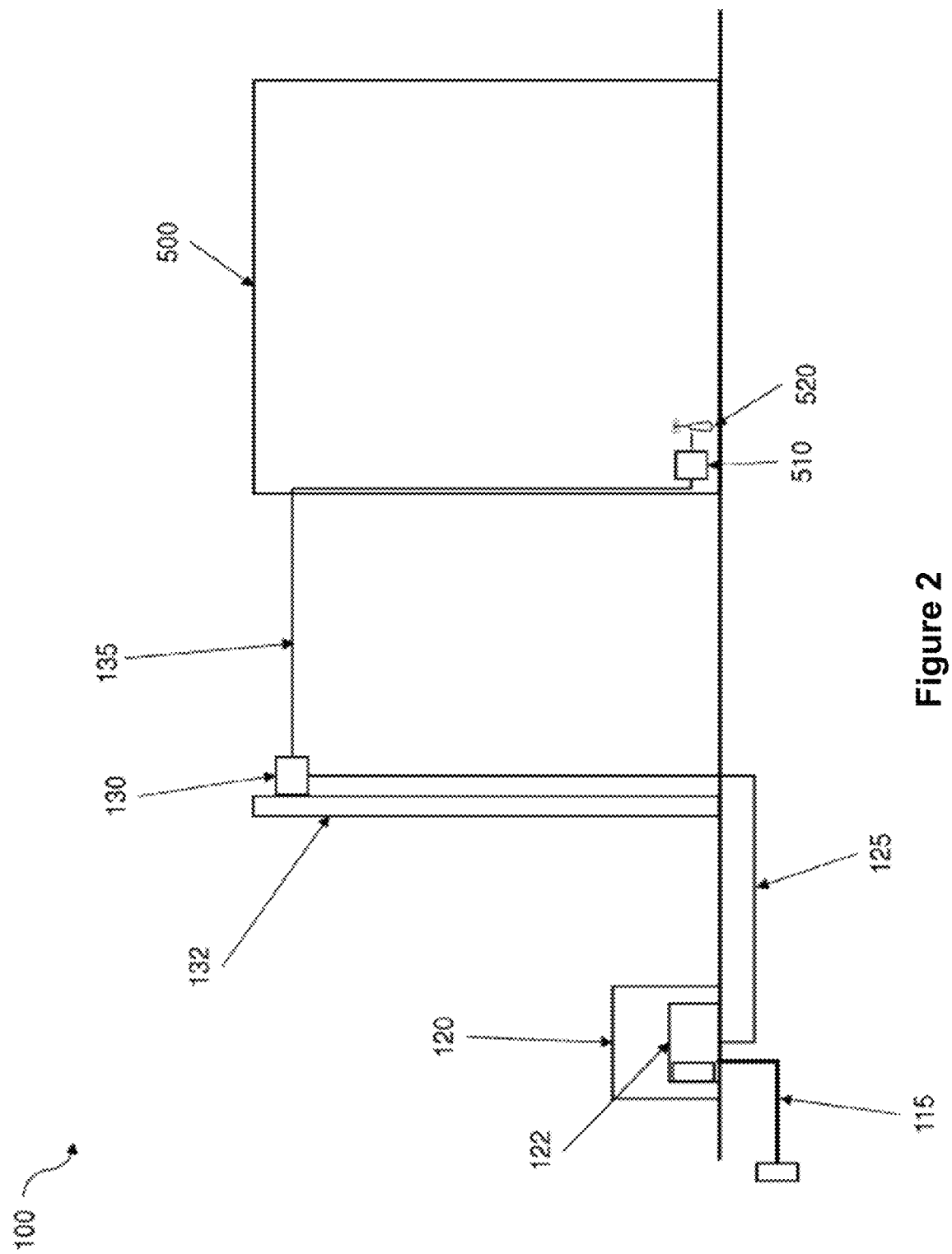
FIG. 2 shows a schematic shows a schematic depiction of a single line from the hybrid fiber-copper access network of FIG. 1.
Figure 3:
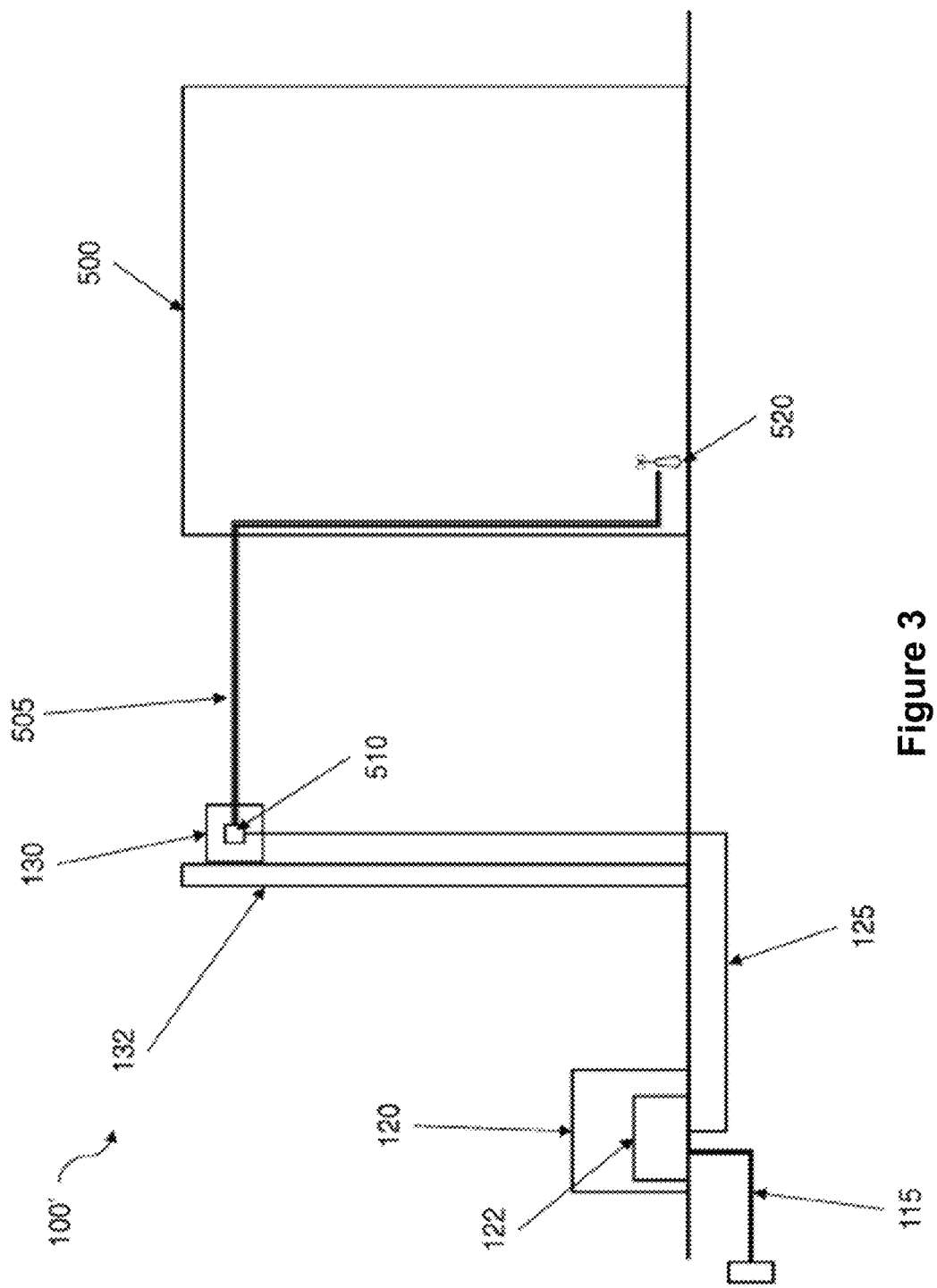
FIG. 3 shows a schematic depiction of a single line from a hybrid fiber-copper access network according to a further network architecture.

FIG. 3 shows a schematic depiction of a single line from a hybrid fiber-copper access network 100' according to a further network architecture as described in the Applicant's co-pending European Patent Application No. EP18156369.3. Similarly to the line described above with respect to FIG. 2, a cabinet 120 is connected to the exchange (not shown) via optical fiber cable 115. The cabinet 120 houses a multiplexer 122 which is connected to the optical fiber cable and a copper cable 125. The copper cable is routed physically from the cabinet to the distribution point 130, which is commonly located at, or near to the top of a telephone pole 132.

The network terminates at the distribution point with the modem 510 located at the distribution point. The modem is connected to the customer premises apparatus 520 via a further cable 505. In operation, the multiplexer receives optical data signals from the exchange via the optical fiber cable. The optical data signals will be converted into G.fast electrical signals and transmitted over the copper cable to the distribution point where they will be received by the modem. The modem will demodulate the G.fast signals and will generate a sequence of Ethernet packets. These packets can then be transmitted over the cable 505 to the customer premises apparatus 520 such that the data packets can be transmitted to the respective device.

The cable 505 preferably comprises four twisted copper pairs and meets the requirements of Category 5e twisted pair cable such that the use of Gigabit Ethernet (IEEE 802.3ab) allows a data rate of 1 Gbit/s to be supported over a length of up to 100 m. The use of Power over Ethernet (PoE) means that the modem can be powered using an electrical power signal sent via the cable 505 such that there is no need to provide a dedicated electrical power supply to the distribution point.

Figure 4:
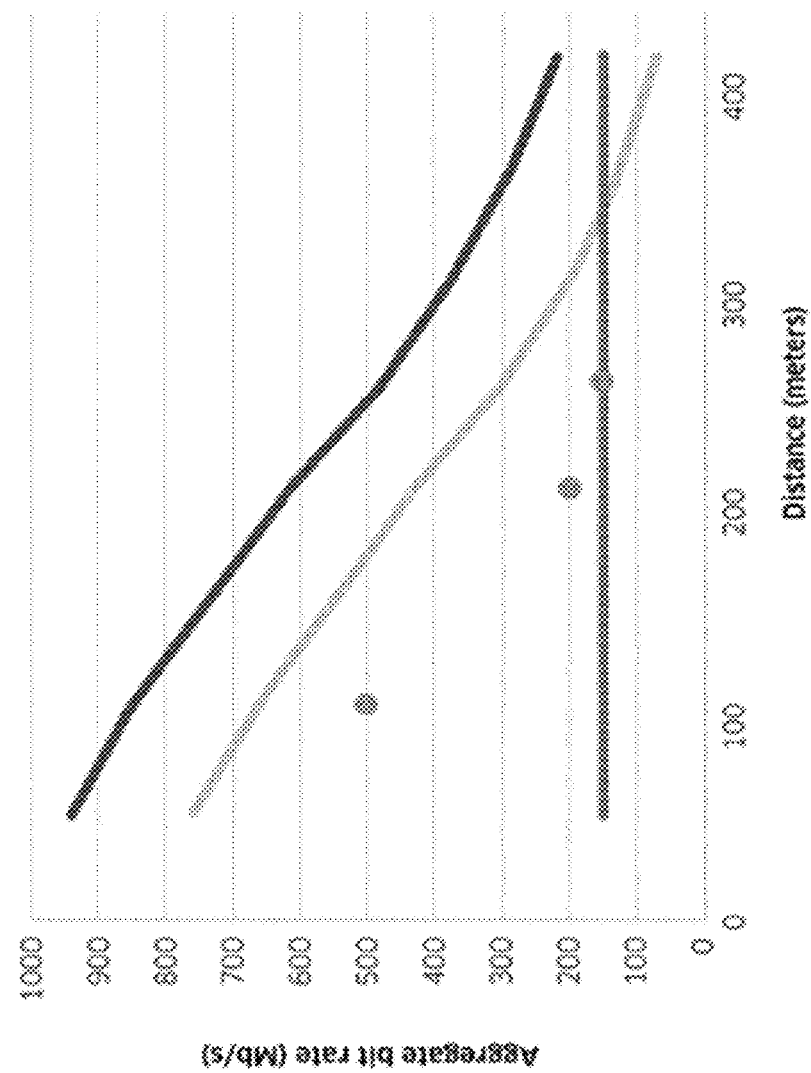
FIG. 4 shows a shows a graphical depiction of the relationship between bit rate and distance for VDSL and G.fast.

The data rate achievable with G.fast varies strongly with the length of the metallic cable over which the G.fast signals are transmitted. FIG. 4 shows a graphical depiction of the relationship between bit rate and distance for VDSL and G.fast (the graph is taken from https://networks.nokia.com/solutions/g.fast). The horizontal line indicates the performance of VDSL with vectoring whilst the two sloping lines indicate the respective performance of two different G.fast implementations (the difference in performance is due to the different frequency bands which are used in each implementation). It can be seen from FIG. 4 that for the G.fast implementation with the lower bit rate (that is, the lower sloped line in FIG. 4) G.fast has a better performance than VDSL for distances of up to 350 m. Referring to FIG. 2, this distance is the distance between the multiplexer and the modem. It can also be seen from FIG. 4 that the drop-off in bit rates is relatively steep. Referring again to the characteristic of the G.fast implementation with the lower bit rate it can be seen that for a distance of 200 m the bit rate is about 450 Mbit/s whilst at a distance of 300 m the bit rate is less than 250 Mbit/s.

Figure 5:
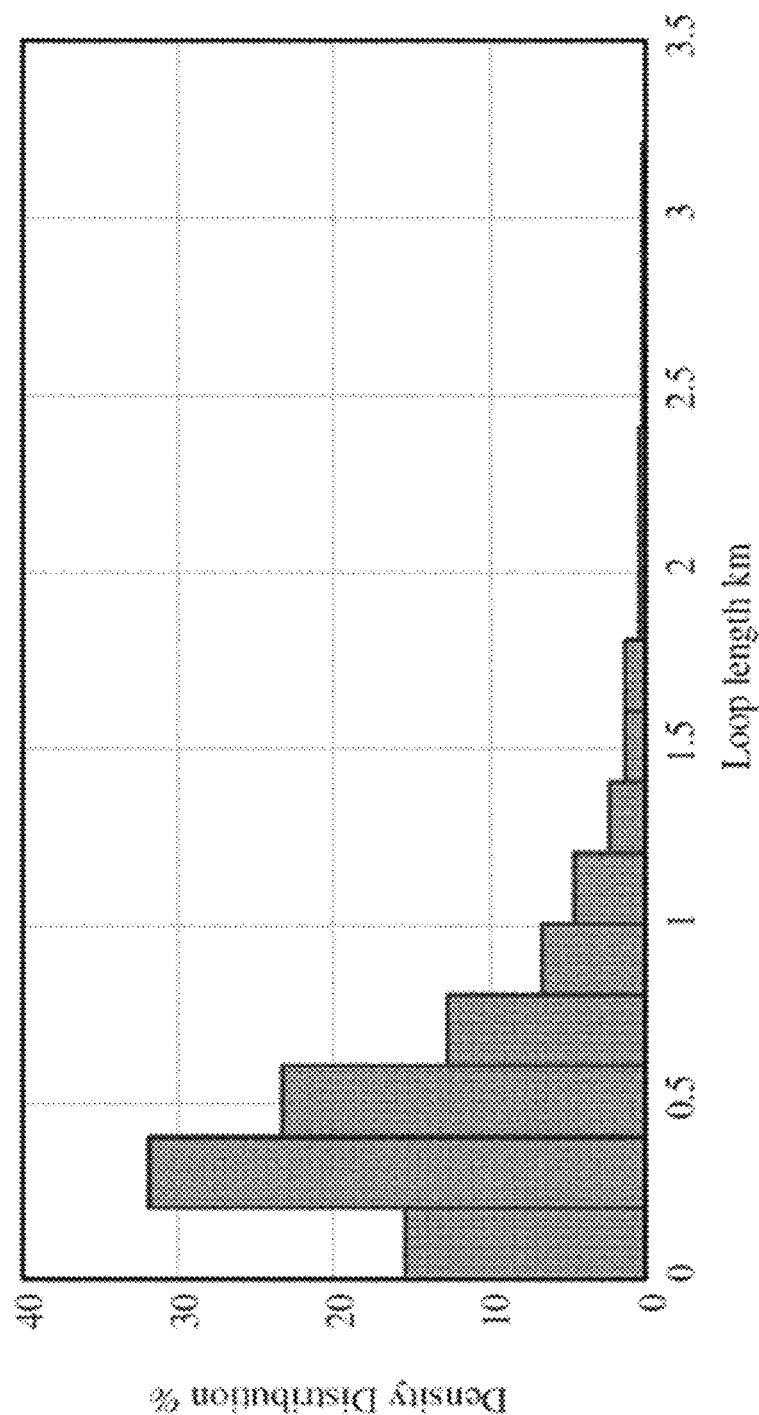
FIG. 5 shows a graphical depiction of the cable length between the cabinet and the customer premises.

By shortening the distance between the multiplexer and the modem it is possible to increase the data rate which can be provided to a customer, as can be seen from FIG. 4. FIG. 5 shows a graphical depiction of the cable length between the cabinet and the customer premises for the Applicant's network (taken from "Assessment of the theoretical limits of copper in the last mile", prepared for Ofcom, document reference OF013, July 2008). FIG. 5 shows that nearly half of these cable lengths are less than 400 m long. Thus, by reducing this median cable length by approximately 30-50 m by locating the modem at the distribution point then it is possible to increase the available bit rate, potentially by up to 10%.

The modem is preferably located at least 5 meters from the customer premises. For distances below this then the advantage gained from the present invention will be minimal. The maximum distance of the modem location from the customer premises is 100 m as this is the limit for the Gigabit Ethernet protocol. It is thought that there will be few customer premises where the distance to the distribution point is in excess of 100 m. The improvement in data rate will vary in accordance with the relative length of the network in question. Network connections where the length of the cable connecting the customer premises to the distribution point is large relative to the length of cable connecting the customer premises to the cabinet are likely to experience the largest increases in data rate.

FIG. 3 shows an embodiment of the disclosure being used when the distribution point is mounted at the top of a telephone pole. It will be understood that a distribution point may also be located in a footway box at the base of, or near to the base, of a telephone pole. Furthermore, FIG. 3 shows that the drop wire is routed from the distribution point to the customer premises as an overhead cable. It will be understood that alternatively the drop wire may be routed from the distribution point to the customer premises through an underground duct or directly buried into the ground.

Figure 6:
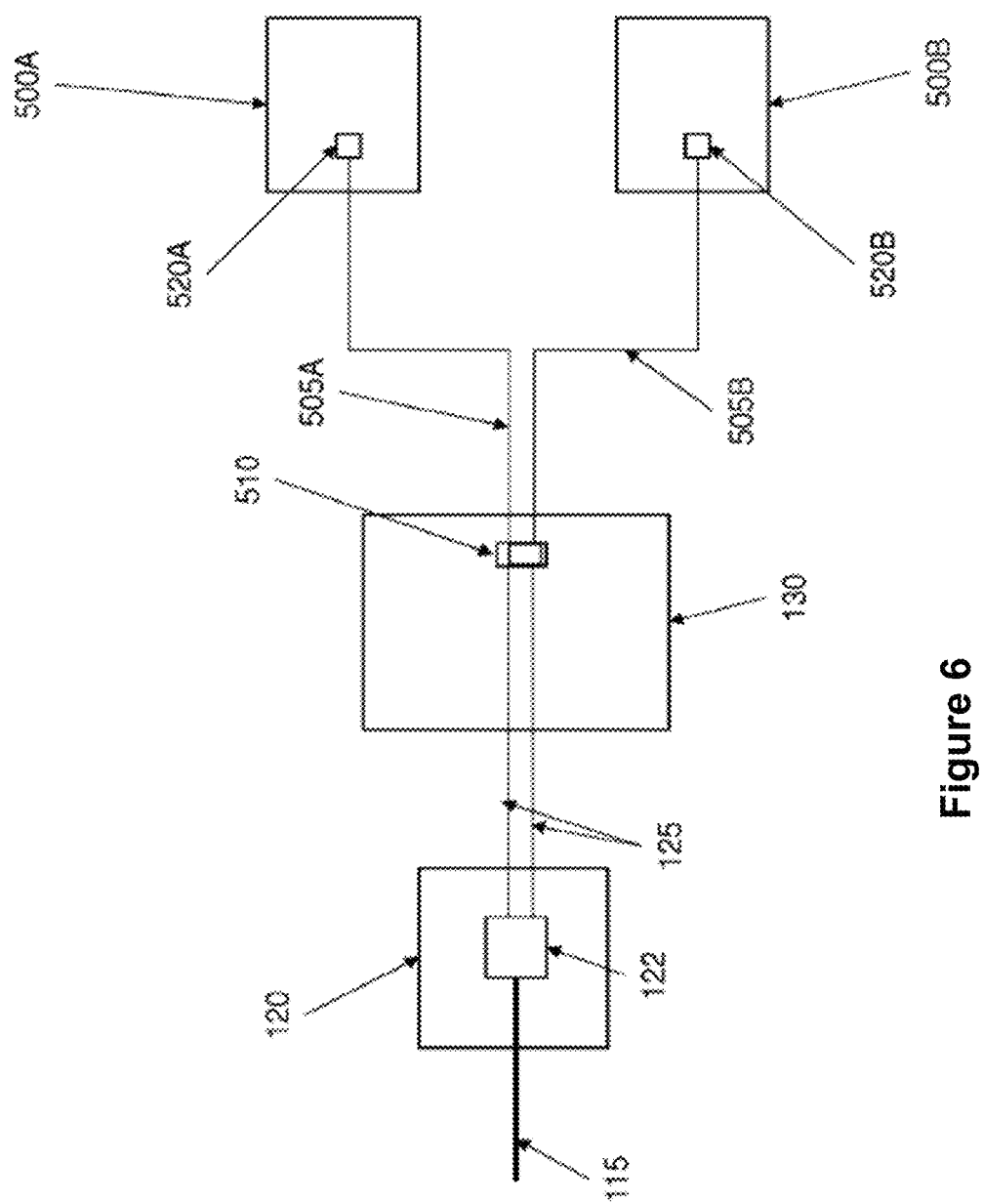
FIG. 6 shows a schematic depiction of a hybrid fiber-copper access network according to an embodiment of the present disclosure.

FIG. 6 shows a schematic depiction of a hybrid fiber-copper access network according to an embodiment of the present disclosure. The network comprises a cabinet 120 which is connected to an exchange (not shown) via optical fiber cable 115. The cabinet 120 houses a multiplexer 122 which is connected to the optical fiber cable and to a copper cable 125. The multiplexer is preferably a G.fast multiplexer and operates in the manner as described above. The copper cable is routed physically from the cabinet to a distribution point 130. The distribution point will typically serve up to 8 customers but for the sake of clarity the present disclosure will be described for the scenario where two customers are served from the distribution point. The distribution point further comprises a modem 510. The modem 510 is connected to a first customer premises apparatus 520 located in a first customer premises 500A via cable 505A. Furthermore, the modem 510 is connected to a second customer premises apparatus 520B located in a second customer premises 500B via a cable 505B.

The modem 510 receives the electrical G.fast packets which are transmitted from the multiplexer. The modem is connected to the multiplexer via two copper pairs in the copper cable 125. The first of these copper pairs will carry a first G.fast channel, which is transmitted as a differential mode signal, in a conventional manner. Similarly, the second copper pair will carry a second G.fast channel, also transmitted as a differential mode signal. Furthermore, a 'phantom mode' may be used to transmit a third G.fast channel. One of the differential signals which comprise the phantom mode will be transmitted over one of the wires which comprise the first copper pair. Similarly, the second differential signal which comprises the phantom mode will be transmitted over one of the wires which comprise the second copper pair. As both the copper pairs are connected to the modem 510 it is possible to process the signals received from the first and second copper pairs to recover the differential mode signals which comprise all three of the G.fast channels. This technique enables the two copper pairs to be used to support the transmission of 3 G.fast channels.

The G.fast packets transmitted in the G.fast channels can be demodulated by the modem 510 and then transmitted to the appropriate customer premises apparatus 520A, 520B. It will be understood that the additional data transmission capacity provided by the transmission of the phantom mode G.fast channel can be used in one of a number of different ways, for example and without limitation: the capacity provided by the phantom mode can be shared equally between the two different customers; the entirety of the capacity can be provided to one of the customers; the capacity may be split dynamically between the customers dependent on demand, etc.

It will be understood that the example described above in relation to a single phantom mode being transmitted using two copper pairs can be extended such that multiple phantom modes can be transmitted using a multiple copper pairs.

FIGS. 7a and 7b show a schematic depiction of a hybrid fiber-copper access network according to a further embodiment of the present disclosure. The hybrid fiber-copper access network is as described above with reference to FIG. 6 but in this case the operation is being described in respect of only a single customer for the sake of clarity. Referring to FIG. 7a, DSLAM 122 is connected to concentrator 138 with two of the copper pairs from copper cable 125. Each of these copper pairs carries a respective G.fast channel, both of which carry data which is being routed to or from the customer premises apparatus 520 in the customer premises 500. The concentrator will route the G.fast packets from the two G.fast channels to the modem 510 such that the G.fast packets can be demodulated and transmitted over cable 505 as Gigabit Ethernet packets. It should be understood that whilst FIG. 7 shows two of the copper pairs from the cable 125 being used to transmit two G.fast channels to the customer premises apparatus it will be understood that this idea can be generalized such that multiple G.fast channels can be provided using multiple copper pairs in the cable 125.

The use of such a network allows a single customer to receive two or more G.fast channels, enabling the provision of greater data transmission capacity without the need to provide FTTH or a second metallic dropwire to the customer premises.

FIG. 7b shows an alternative scenario in which the functionality of the concentrator is combined into the modem, such that the two copper pairs are directly connected into the modem. The modem will demodulate the G.fast packets and ensure that the Gigabit Ethernet packets are transmitted over cable 505 to the customer premises apparatus 520. It will be understood that the network shown in FIGS. 7a and 7b could be used to transmit more than two G.fast channels to a particular customer. The concentrator 138 can be used to process multiple channels for more than one customer.

It will be understood that the network shown in FIGS. 7a and 7b will require additional network resources being devoted to a single customer. To provide two G.fast channels to a customer requires that a second DSLAM output port is used and that a second copper pair is available between the DSLAM and the modem. Typically a distribution point serves up to eight customers and will be connected to a network cabinet (and thus the DSLAM) via a 10 pair copper cable (or in some circumstances a 20 pair cable).

It will be understood that the concentrator 138 described above with reference to FIG. 7a will also need to be powered by the PoE signal supplied over the cables 505. Rather than providing a modem for each user a single modem may be provided at each distribution point, with a given capacity of 8/10/12/16 input and output ports. A network operational support system can be used to control the operation of the modem such that the data routed over the respective G.fast channels from the DSLAM is routed to the appropriate output ports. It should be understood that there is no technical reason why the use of phantom modes to provided additional G.fast channels (as described above with reference to FIG. 6) should not be used alongside the transmission of multiple G.fast channels (as described above with reference to FIG. 7).

It should be remembered that the link between the modem and the customer apparatus is a Gigabit Ethernet link and thus limited to 1000 Mbit/s so there is no benefit in arranging multiple G.fast channels if the aggregate data capacity is greater than 1000 Mbit/s. It is envisaged that the benefit of the present invention will be to provide a cost effective increase in data capacity without requiring excessive investment in network infrastructure. For example, if there is a customer requirement for a 300 Mbit/s connection but the downstream data capacity is 200 Mbit/s when using a network as described above with reference to FIG. 3 then the most cost effective measure will be to provide a second G.fast channel either through transmitting a phantom mode (FIG. 6) or by transmitting a second G.fast channel (FIG. 7). Otherwise it would be necessary to provide a FTTP link to provide the required data capacity.

Allow the foregoing discussion has referred exclusively to G.fast it will be understood that the present invention could be used with other digital subscriber line technologies which use a FTTC network architecture such as VDSL, VDSL2, etc.

According to one aspect, the present disclosure provides a network architecture in which the modem in a hybrid metallic-optical fiber access network is moved from the customer premises to the distribution point. Multiple copper pairs can be used to transmit phantom modes over the copper pairs to the distribution point. Alternatively, or in addition, multiple data signals can be transmitted to a single customer premises with the modem collating the multiple data signals at the distribution point.

The invention claimed is:

1. A hybrid optical fiber-metallic access network comprising:
   a multiplexer which is connected to an optical fiber cable and connected to a first end of a metallic cable, the multiplexer being located at a first network location; and
   a distribution point which is connected to a second end of the metallic cable, the distribution point being located away from a customer premises at a second network location and including a concentrator and a modem, the modem being connected to an apparatus in the customer premises by a further cable,
   wherein, in use,
      the multiplexer is configured to transmit data using a plurality of data channels processed and according to a first protocol, the plurality of data channels being provided by at least two copper pairs in the metallic cable and one or more phantom modes, and
      the modem is configured to receive the plurality of data channels processed according to the first protocol and to transmit the data over the further cable to the customer premises apparatus using a second protocol.

2. The hybrid optical fiber-metallic access network according to claim 1, wherein the modem is connected to a second apparatus in a second customer premises by another cable, and the modem is configured to transmit data received from the multiplexer for the second apparatus over the another cable to the second apparatus in the second customer premises.

3. The hybrid optical fiber-metallic access network according to claim 1, wherein, in use, the multiplexer is configured to transmit two or more data signals processed according to the first protocol to the customer premises apparatus, each of the two or more data signals being transmitted using a respective one of the plurality of copper pairs comprised within the metallic cable.

4. The hybrid optical fiber-metallic access network according to claim 1, wherein the multiplexer is a digital subscriber line multiplexer.

5. The hybrid optical fiber-metallic access network according to claim 4, wherein the first protocol is a digital subscriber line data protocol.

6. The hybrid optical fiber-metallic access network according to claim 5, wherein the digital subscriber line data protocol is one of G.fast or VDSL.

7. The hybrid optical fiber-metallic access network according to claim 1, wherein the second protocol is gigabit ethernet.

8. The hybrid optical fiber-metallic access network according to claim 1, wherein the multiplexer is a digital subscriber line multiplexer.

9. The hybrid optical fiber-metallic access network according to claim 1, wherein a cabinet is located at the first location.

10. The hybrid optical fiber-metallic access network according to claim 1, wherein the second location is located at least five meters away from the customer premises.

11. The hybrid optical fiber-metallic access network according to claim 1, wherein the modem is configured, in use, to transmit data to and from the apparatus in the customer premises.

12. The hybrid optical fiber-metallic access network according to claim 11, wherein the apparatus in the customer premises transmits electrical power to the modem over the further cable.

13. The hybrid optical fiber-metallic access network according to claim 11, wherein the apparatus in the customer premises is at least one of a wireless access point or a router.

* * * * *